No. 710,497. Patented Oct. 7, 1902.
J. C. MYERS.
SNAP HOOK.
(Application filed May 5, 1902.)
(No Model.)
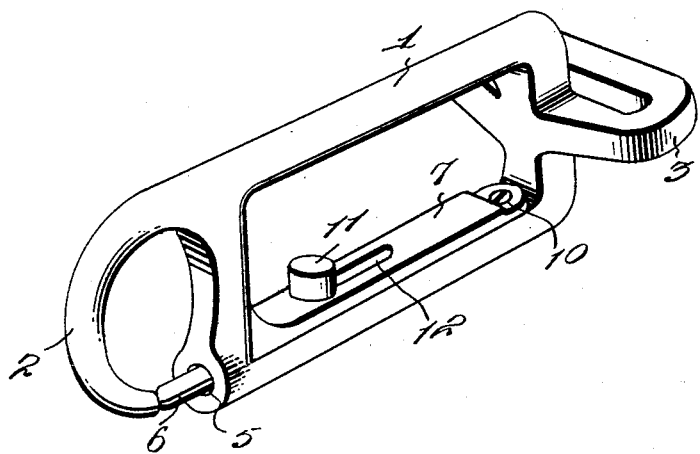
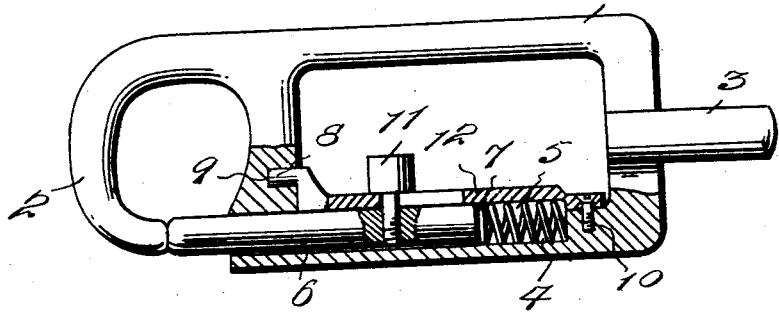
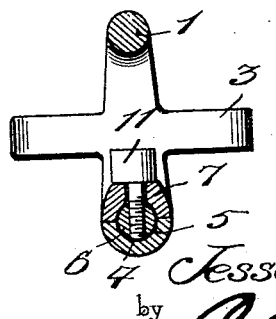
Witnesses
E. F. Stewart
R. M. Elliott
Jesse C. Myers Inventor
by C. A. Snow & Co
Attorneys

UNITED STATES PATENT OFFICE.

JESSE C. MYERS, OF WILT, PENNSYLVANIA.

SNAP-HOOK.

SPECIFICATION forming part of Letters Patent No. 710,497, dated October 7, 1902.

Application filed May 5, 1902. Serial No. 106,058. (No model.)

*To all whom it may concern:*

Be it known that I, JESSE C. MYERS, a citizen of the United States, residing at Wilt, in the county of York and State of Pennsylvania, have invented a new and useful Snap-Hook, of which the following is a specification.

This invention relates to snap-hooks.

The object of the invention is in a ready, simple, thoroughly-feasible, and practical manner to obviate accidental retraction of the bolt, and thus release of the snap from the harness, which frequently happens by the animal rubbing against troughs, posts, and the like.

With these and other objects in view, as will appear as the nature of the invention is better understood, the same consists in the novel construction and combination of parts of a snap-hook, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of a snap-hook constructed in accordance with the present invention. Fig. 2 is a view in side elevation, partly in section. Fig. 3 is a view in transverse section.

The snap-hook comprises a hollow rectangular shank 1, carrying at one end a hook 2 and at the opposite end a loop or eye 3, all of the parts by preference being integral. One of the shank members is provided with a semicircular groove 4, forming a continuation of an opening 5 in the end of the member, and in this groove and opening is mounted a bolt 6, the bolt being held in position within the groove by a plate 7, having a semicircular groove to embrace the bolt, the forward end of the plate being provided with a lug or projection 8, which engages an orifice 9 in the front transverse member of the shank, the rear end of the plate being secured to the shank by a screw or rivet 10. Connected with the bolt in any preferred manner is a knob 11, the shank of which projects through a slot 12 in the plate, as clearly shown in Fig. 2, the knob being disposed between the two shank members, and thus is positively shielded against being operated by contacting with a post, trough, or the like should the animal be rubbing against such objects. In order to cause the bolt normally to engage with the hook 2, a spring 5 is disposed in its rear, as clearly shown in Fig. 2.

As will be apparent, the disposition of the knob-bolt as herein disclosed will render the hook perfectly safe in use without adding materially to its cost of production or rendering the hook as a whole intricate or cumbersome.

It is to be understood in practice that the hook may be varied as to shape and the proportion between the different parts and still be within the scope of the invention.

Having thus fully described my invention, what I claim as new, and desire to secure by Letters Patent, is—

1. A snap-hook comprising a rectangular shank provided at one end with an eye or loop and at the opposite end with a hook, a spring-pressed bolt housed in one of the side members of the shank and projecting through one of the transverse members thereof and coacting with the hook, a plate for holding the bolt in position, and a bolt-knob disposed within the shank and having its stem projecting through a slot in the plate.

2. A snap-hook comprising a rectangular shank provided at one end with an eye or loop and at the opposite end with a hook, a spring-pressed bolt carried by one of the shank members and coacting with the hook, a bolt-holding plate having at one end a projection for engaging an orifice in the shank, and having its other end rigidly secured to the shank, and a bolt-knob disposed within the shank and having a stem projecting through a slot in the plate.

In testimony that I claim the foregoing as my own I have hereto affixed my signature in the presence of two witnesses.

JESSE C. MYERS.

Witnesses:
JOHN C. DEETER,
J. LUTHER MAY.